United States Patent [19]

Heartz

[11] Patent Number: 4,855,937

[45] Date of Patent: Aug. 8, 1989

[54] DATA BLOCK PROCESSING FOR FAST IMAGE GENERATION

[75] Inventor: Robert A. Heartz, DeLand, Fla.

[73] Assignee: General Electric Company, Syracuse, N.Y.

[21] Appl. No.: 638,708

[22] Filed: Aug. 8, 1984

[51] Int. Cl.$^4$ ............................................... G09B 9/00
[52] U.S. Cl. ................................... 364/521; 364/522; 364/700
[58] Field of Search ... 364/900 MS File, 200 MS File, 364/522, 700, 731, 521

[56] References Cited

U.S. PATENT DOCUMENTS 4,489,389 12/1984 Beckwith et al. .................... 364/522
4,583,185 4/1986 Heartz ................................ 364/700

Primary Examiner—Salvatore Cangialosi
Attorney, Agent, or Firm—Stephen A. Young; Carl W. Baker

[57] ABSTRACT

An improvement for the real-time computer generation of visual scenes based on an algorithm that reduces the processing of elevation data to simple repetitive accumulations and a compare operation to generate occult data using grid elevation data bases is disclosed. The improvement reduces the size of the on-line, high speed, random access, data base memory required in image generation from grid data bases and reduces image generation time. The grid data base is divided into an array of data blocks. The data blocks are sequentially transferred to on-line ping-pong buffer memories (14), and each data block is processed through to final display by a view ray processor (16). The order of block selection is such that the sweep data remains continuous. When a sweep leaves a block, exit processing parameters are stored in a sweep horizon memory (18) as sweep parameters. When the sweep is again continued in a future block, the sweep parameters are transferred to the view ray processor (16) and an X,Y address generator (20) as initial conditions.

6 Claims, 4 Drawing Sheets

FIG. 6
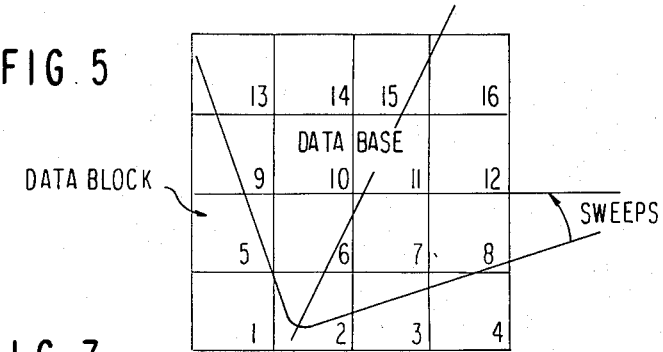
| SWEEP | x | y | R | TAN $\phi_m$ | $\Delta x$ | $\Delta y$ | $\Delta R$ |
|---|---|---|---|---|---|---|---|
| 0 | | | | | | | |
| ⋮ | | | | | | | |
| 512 | | | | | | | |
FIG. 5
FIG. 7
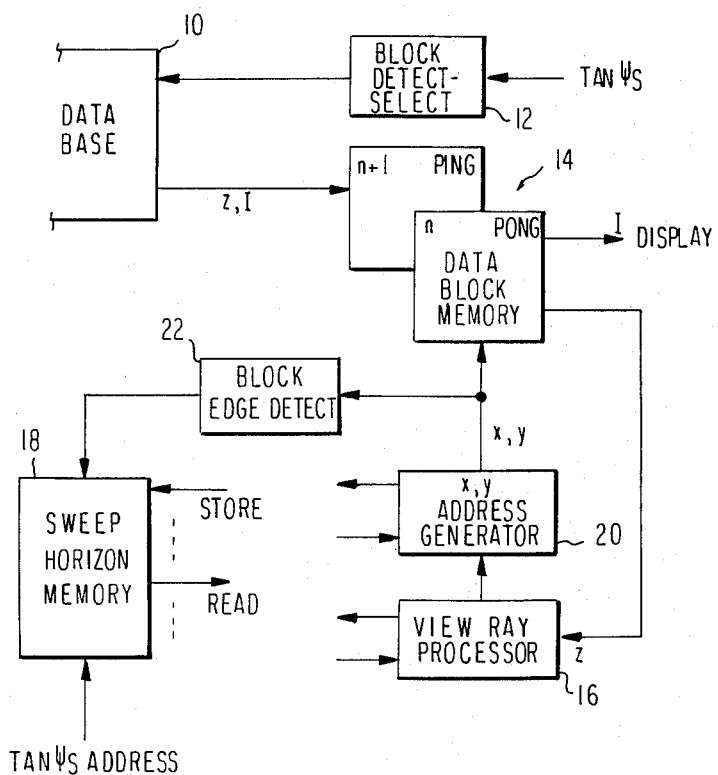

DATA BLOCK PROCESSING FOR FAST IMAGE GENERATION

CROSS-REFERENCE TO RELATED APPLICATION

The present invention is an improvement to my invention described in U.S. patent application Ser. No. 546,599 filed Oct. 28, 1983, entitled "Incremental Terrain Image Generator", and assigned to the assignee of this application. The subject matter of my earlier filed application is incorporated herein by reference.

FIELD OF THE INVENTION

This invention generally relates to a system and technique for the generation of images on a display device and, more particularly, to real-time computer simulation of visual images of perspective scenes such as landscapes and seascapes.

BACKGROUND OF THE INVENTION

The principle application area for computer image generation (CIG) has been that of visual training simulators which present scenes to an observer or trainee to allow the observer to practice some task, such as flying an airplane. In a flight simulator, a three-dimensional model of the desired "gaming area" is prepared and stored on magnetic disk or similar bulk storage media. This model is called the visual data base. The visual simulator combines an image generator with an electro-optical display system such as a cathode ray tube (CRT) of similar display. The image generator reads in blocks of three-dimensional data from the disk and transforms this data into two-dimensional scene descriptions. The two-dimensional data are converted to analog video that is presented to the operator or trainee via the display. The generated imagery is meant to be representative of the true scenes that the operator would see if the operator were actually performing the task being simulated. The generation of the display images is said to be in "real time" which is normally taken to mean 30 frames per second, as in the U.S. television standard. CIG systems are described in detail in the book entitled *Computer Image Generation* edited by Bruce J. Schacter and published by Wiley-Interscience (1983).

Computer generation of visual representations of objects whose various vertices, edges and planes are defined by data bases referenced to a system of axes is described in U.S. Pat. Nos. 3,603,703 to Warnock, 3,621,214 to Romney et al, and 3,665,408 to Erdahl et al. These teach general means for converting such data into a two-dimensional perspective view, with tests for determining which of several overlapping objects will be visible and conceal the others. The scan employed for presentation of the visual image on a cathode-ray tube (CRT) is a conventional horizontally scanned raster. U.S. Pat. No. 3,671,729 to Lux teaches means to cause a mechanical plotter to draw curves or profiles (provided as electrical input signals giving elevation and range for successive radial scans) in which the profile parts which would be out of the field of view of an elevated observer are omitted. The device is not indicated as having any application to electronic image generation, nor does it appear that it could be so applied. U.S. Pat. No. 3,736,564 to Watkins teaches the conversion of electrical signals defining surfaces of a three-dimensional object onto a device such as CRT. The converted signals defining the relative depths of segments of the surfaces along each scan line of the display and selectively subdividing the scan lines according to the visual characteristics of the segments when necessary. Signals defining the visible segments are then utilized to control the intensity of the display.

The real-time computer generation of visual images of landscapes and seascapes find particular use in aircraft or ship simulators. U.S. Pat. No. 3,769,442 to Heartz et al describes a process for producing a compressed data base for a radar land mass simulator. U.S. Pat. No. 4,017,985 to Heartz describes a process for the generation of a perspective scene in which the tangent of the view angle is computed for each range element along a sweep. This process requires a high speed multiply and divide to compute the tangent which is then compared to a stored maximum to determine if the element is seen. If it is seen, it is compared to the last value to fill in skipped pixels. U.S. Pat. No. 4,343,037 to Bolton describes a visual display system in which a pipeline processor is used to compute in real-time the perspective transformation from the textured ground surface plane to the display plane. Application Ser. No. 527,809 filed Aug. 30, 1983, by M. Bunker and assigned to the assignee of this application discloses techniques to reduce dynamic aliasing problems in real time images generated from a textured grid data base.

Real-time generation of visual scenes is at best a difficult computational problem. The more realistic the scene, the more complex the computational problem seens to become. This in turn imposes a severe requirement on the hardware design. In my prior application Ser. No. 546,599, I describe an algorithm for the real-time computer generation of visual scenes that uses a few simple mathematical functions resulting in a significant speed-up of scene generation time and a corresponding simplification of the hardware requirements. I accomplished this by replacing the multiply and divide operations normally performed with simple, repetitive accumulate operations. Seen elements and pixel fill-in are implemented by a single compare. The range elements of the sweep are scanned by progressively incrementing a delta view angle tangent. Occulting is determined by comparing the projection on the Z axis of delta view angle tangent at the element range to the altitude minus element elevation. If the projection is greater than altitude minus element elevation, the point is seen and the delta tangent view angle is incremented. Otherwise, the point is hidden and the range is incremented. The invention described in my prior application Ser. No. 546,599 uses an X-Y grid data base of the type produced by the Defense Mapping Agency (DMA) in contrast to the vector schemes that were typically used in the prior art. Since only simple addition operations performed with an accumulator and a compare operation are used, the mathematical processing is greatly simplified when compared with the multiplication and division operations resorted to by the prior art.

In addition to the computational problems presented by real-time generation of visual scenes, other limitations in computational speed result from memory accesses to the very large data bases used. As previously mentioned, these data bases are typically referred to as "Winchester" or hard disks and are characterized by the fact that the magnetic medium is not removable. This tyupe of disk storage provides very fast access compared with other bulk storage devices, but the access times are still much too long to allow real-time processing. Therefore, it has been proposed to read the data base into random access memory (RAM) which provides almost instantaneous access. However, this has not been a practical solution except in those cases where the data base is limited because of the comparatively greater cost of RAM compared to disk memory.

SUMMARY OF THE INVENTION

It is therefore an object of the present invention to reduce the size of on-line, high-speed, random access, data base memory required in computer image generation from grid data bases.

It is another object of the invention to provide a software image generation technique which reduces image generation time by permitting the data base to be stored in computer on-line RAM.

The objects of the invention are accomplished by dividing the data base into an array of data blocks. The data blocks are sequentially transferred to on-line, ping-pong buffer memories, and each data block is processed through to final display. The technique according to the invention recognized that the order of block selection must be such that the sweep data remains continuous. More specifically, sweep continuity is assured by first selecting the block closest to the viewpoint for processing and then sequentially processing the next row or column blocks. When a sweep or view-ray is incremented, its values are saved. These values are called the local horizon. When the sweep is again continued in a future block, the sweep parameters are transferred to the processors as initial conditions. When all data blocks are processed, the local horizon becomes the true horizon. In software image generation, the block approach according to the invention reduces image generation time by permitting the data base to be stored in computer on-line RAM memory. In hardware systems, the amount of on-line, high speed, RAM is reduced. Further, the block sequence approach permits parallel processing to more easily achieve real time image generation. Fast moving foreground data can be selectively processed relative to slow moving background data.

BRIEF DESCRIPTION OF THE DRAWINGS

The foregoing and other objects, aspects and advantages of the invention will be better understood from the following detailed description with reference to the drawings, in which:

FIG. 5 is a plan view illustrating a 512×512 grid point data base defined as a 4×4 block array;

FIG. 6 is a tabular representation of the sweep table in the image generator memory;

FIG. 7 is a block diagram of a hardware implementation of the data block processing according the present invention.

DETAILED DESCRIPTION OF THE INVENTION

Figure 1:
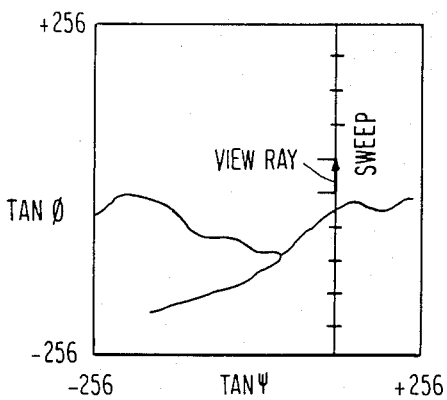
FIG. 1 is a diagrammatic illustration of a 512×512 element CRT display wherein the number of elements correponds to a grid data base.
Figure 2:
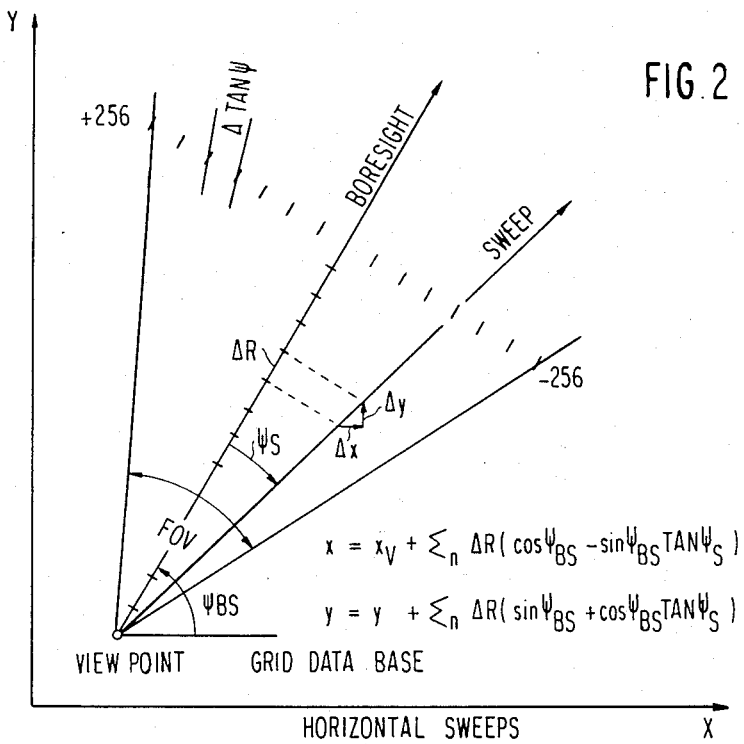
FIG. 2 is a graphical representation of the horizontal sweeps from the view point.

A description of the data block processing according to the present invention must be preceded with an understanding of the view ray approach which will be described with reference to FIGS. 1 to 4 of the drawings. Terrain occulting, that is what is hidden from a specific viewpoint, is a key calculation to all image generators. My earlier invention described in application Ser. No. 546,599 provided a fast summation algorithm for generating occult data or perspective scenes using grid elevation data bases. Such grid data bases are produced, for example, by the Defense Mapping Agency (DMA). A DMA terrain elevation data base is typically a 512×512 array of elevation posts that are 300 feet apart. A corresponding planimetric grid data base defines feature colors such as for lakes, forests, snow caps, fields and so forth. According to the view ray processing technique, a vertical column of the output image, i.e. a vertical raster, is first defined as a sweep which is composed of 512 view ray elements, as shown in FIG. 1. The horizontal field of view (FOV) is defined as plus and minus 256 sweeps which are defined by equal increments perpendicular to the boresight. Any sweep is transformed to the grid data base as shown in FIG. 2. The processing starts incrementing $\Delta R$ from the view point. $\Delta R$ is shown as equal steps, but in practice, the $\Delta R$ steps are expanded as they move away from the view point. For any sweep, a $\Delta X$ and $\Delta Y$ can be defined. The accumulation of $\Delta X$ and $\Delta Y$ is the X,Y data base address which is used to extract the elevation and color for that sweep element.

Figure 3:
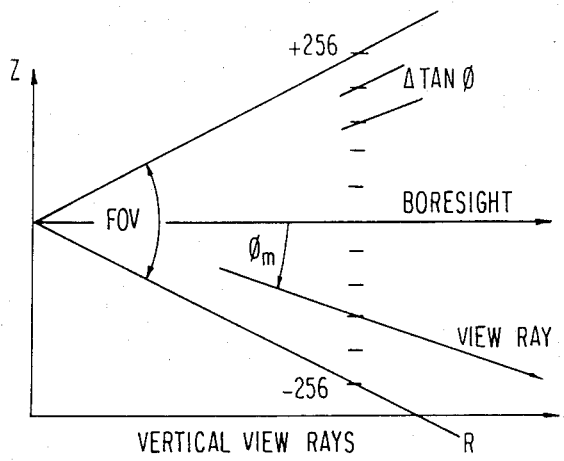
FIG. 3 is a graphical representation of the vertical sweeps from the view point.
Figure 4:
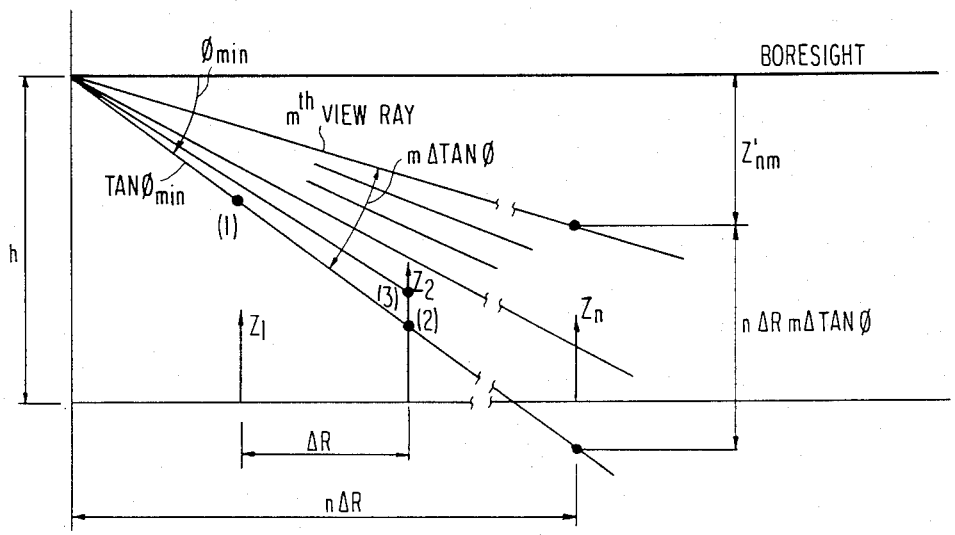
FIG. 4 is a graphical illustration of the view ray processing according to my prior invention.

For a given sweep, the vertical view rays are shown in FIG. 3. Again, the field of view is defined as plus or minus 256 equal steps normal to the view ray. The view ray processing is illustrated in FIG. 4. For each range increment, the view ray steps down by an increment of $\Delta R \tan \phi_{min}$. A simple compare at each range increment determines if the view ray strikes an elevation post. If the view ray is above the elevation post, the next elevation post and color is read from the data base. If the view ray strikes the post, the color for that post is read to the CRT display via a refresh memory.

Considering FIG. 4 in more detail, the edge of the vertical field of view is $\phi_{min}$. The first view ray projection (point 1) on the Z axis is $\Delta R \tan \phi_{min}$. Since $\Delta R \tan \phi_{min}$ is less tha $(h - Z_1)$, $Z_1$ does not intersect the field of view, and therefore we increment to the next elevation, $Z_2$. The projection of the view ray at $Z_2$ is $2\Delta R \tan \phi_{min}$. This is greater than $(h - Z_2)$ which means that $Z_2$ is seen. The tangent of the view angle is incremented to point 3 and, again, $Z_2$ is seen. The tangent of the view angle is incremented until its projection on the Z axis is greater than $(h - Z_2)$, then we increment to the next elevation point and so forth. It is therefore evident that if a view ray strikes an elevation post, that point is seen and remains seen until the view ray is incremented to a point above the elevation post. If a view ray is above an elevation post, then the point is occulted.

Summarizing, for each range increment, the view ray steps down by an increment of $\Delta R \tan \phi_m$, where the subscript "m" refers to the $m^{th}$ view ray. For each range increment, the distance between sweeps increases by the increment $\Delta R \Delta \tan \phi$. A simple compare at each range increment determines if the view ray strikes an elevation post. If the view ray is above the elevation post, the next elevation post and color is read from the data base. If the view ray strikes the post, the color for that post is read to the display via the refresh memories. Thus, view ray processing is implemented by repetitive counters, accumulators and comparators. Priority is automatically handled by incrementing range and the view rays from minimum to maximum.

According to the present invention, a data block format is employed for high speed data entry and processing. A data block in a preferred, exemplary embodiment is a 64×64 grid point array, where each point is a 16-bit word (8 bits for elevation data and 8 bits for color, reflectivity, or emissivity). The read-in of a block of data and processing that one block of data for one sweep would be extremely inefficient and time consuming. What is actually required is to process all the sweeps that intersect a block all the way through to the final display. The problem then becomes one of maintaining sweep continuity. This problem is solved by the present invention by what will be referred to as the horizon concept which allows complete block processing and assures continuous sweeps. Referring to FIG. 5, the 512×512 grid point data base is deinfed as a 4×4 block array. Those skilled in the art will recognize that these figures are somewhat arbitrary having been chosen for matters of convenience in design and that other data base sizes and block arrays can be used in the practice of the invention. Sweep continuity is assured by first selecting the block closest to the viewpoint for processing and then sequentially processing the next row or column blocks. For the arrangement shown in FIG. 5, one block sequence for maintaining continuous sweep data is as follows: 2, 6, 1, 3, 5, 7, 9, 10, 11, 12, 8, 4, 13, 14, 15, 16. There are also other correct row and column oriented sequences.

Thus, the control computer defines a block list for any viewpoint, including one inside a block. When a sweep exits a block, its values must be saved. These values are called the local horizon. It is evident that when all data blocks are processed, the local horizon becomes the true horizon in the perspective scene generation context. The horizon values are saved by generating and updataing a sweep table in the image generator memory. FIG. 6 is a tabular representation of that sweep table. The horizon values are X, Y, R (range), and Tan $\phi_m$, which is the lowest view-ray. The sweep increments $\Delta X$, $\Delta Y$ and $\Delta R$ are constants for each sweep. These are computed once per scene and stored in the sweep table.

FIG. 7 illustrates a hardware implementation of the invention. A 64×64 grid point data base array is read from the dta base 10 in response to the block detect-select 12 output. The block detect-select 12 is in turn responsive to the tangent of the sweep angle Tan $\psi_s$. The data base 10 provides a 16-bit word for each grid point to the ping-pong memory 14. The 16-bit word includes 8 bits for elevation, which is represented in FIG. 7 by Z, and 8 bits for color, reflectivity or emissivity, which is represented in FIG. 7 by I. the ping-pong memory 14 is composed of two 64×64×16 RAMs which are arranged such that while data is being read from one to processor 16, data is being written into the other from data base 10. Elevation data Z is provided to the view ray processor 16 which is the subject of my prior application Ser. No. 546,599. The view ray processor 16 receives initial condition data from the sweep horizon memory 18 at the beginning of the processing for each block and processes the elevation data from the ping-pong memory 14 to determine those elevation posts which are seen and which are occulted. For those which are seen, the I data is read from the ping-pong memory 14 in response to the X,Y address generator 20. As previously described, the X,Y address generator 20 accumultes $\Delta X$ and $\Delta Y$ values to generate the X,Y address in reponse to the output of the view ray processor 16. Like the view ray processor, the X,Y address generator 20 receives X and Y initial values from the sweep horizon memory 18 at the beginning of the processing of each data block. The X,Y address from address generator 20 is also supplied to the block edge detecting logic 22. When the edge of the current block being processed is detected by the logic 22, an output is provided to the sweep horizon memory 18 to cause it to store the current outputs of the view ray processor 16 and the X,Y address generator 20 at addresses determined by Tan $\psi_s$. These values are used as the initial conditions for the processing of a subsequent data block.

The basic implementation of block detect select 12 consists of a memory file and a comparator. The memory file stores the block selection order and the maximum and minimum sweep tangents that intersect each block. The memory file is computed and stored, once per frame, by a host general purpose computer. The minimum sweep tangent is the initial tan$\psi_s$ for the data block. Tan$\psi_s$ is incremented until the comparator defines it to be equal to the maximum sweep tangent. Then ping-pong memory 14 is initiated. The implementation of block edge detect 22 is two comparators that compare the x block edge and the y block edge to the x and y generated address. When x or y exceeds the edge, the sweep is incremented and sweep horizon memory 18 is initiated.

Figure 8:
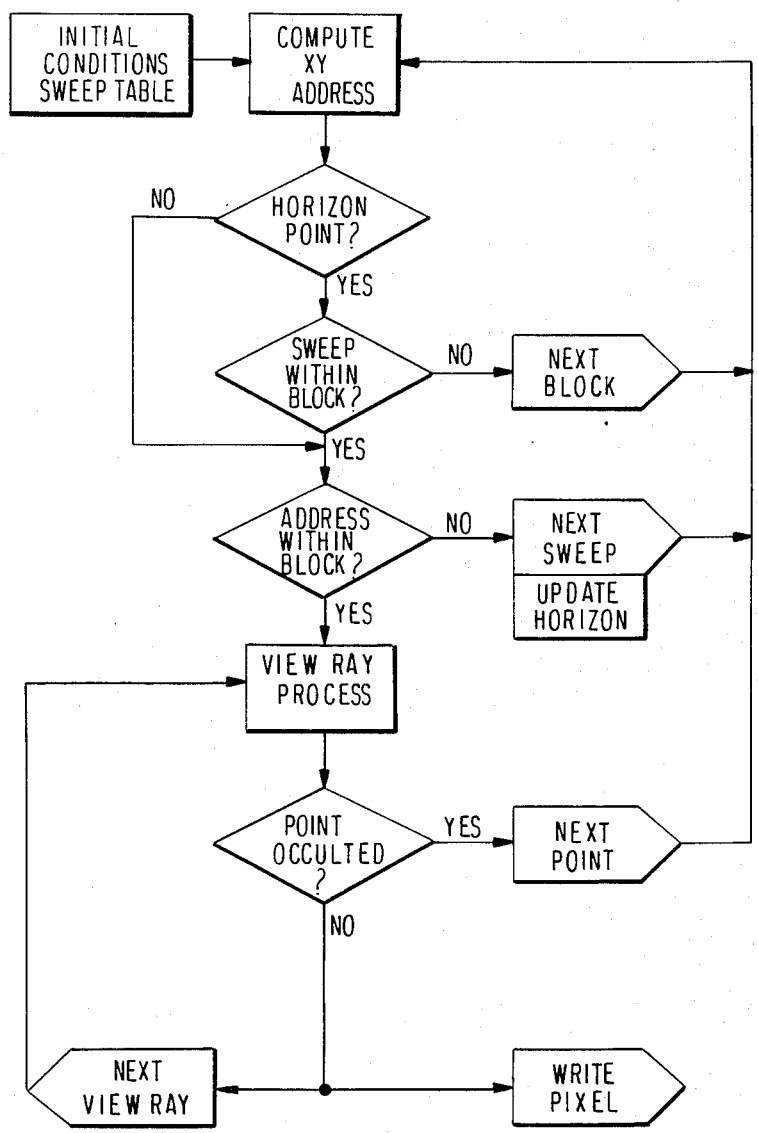
FIG. 8 is a flow diagram illustrating the data block processing according to the present invention.

FIG. 8 illustrates the software processing flow for the horizon approach. First, the initial horizon is set up by incrementing each sweep from the viewpoint to the data base intersection point. If the viewpoint is within the data base, the horizon X,Y address equals the data base X,Y address and horizon range equals zero. If when a sweep is initiated or incremented, the computer point is ouside the data block, the block processing has been completed and the next block is entered into the system. A sweep is incremented within a block when the computed X,Y address exceeds the block. Then, the sweep across the data block has been completed. The next sweep is initiated and at this time the sweep table is updated by the new horizon values, if the point is within the data block, the tangent of the view angle is computed and the point is checked for occulting. If occulted, the next sweep increment is initiated. If not occulted, the next view ray is implemented and the pixel color is written into the display refresh memory. For a perspective scene, the pixel address is Tan$\psi_s$ and Tan $\phi_n$; for a radar scene, the pixel address is $\psi_s$ and slant range.

The development of the horizon concept according to the invention represents a significant advancement in performance capabilities for scene generation systems. The on-line data base can now be implemented with a compact Winchester disk/tape cartridge unit. Thus, when the off-line data bases stored on the tape cartridge are transferred to the disk, these become the on-line data base. Because the data blocks are entered into ping-pong buffer memories, there is no transfer delay when generating a scene.

What is claimed is:

1. In a method of real-time computer generation of visual scenes comprising the steps of storing a grid data base of elevation posts are predetermined intervals for the visual scene to be generated, defining a horizontal field of view as a predetermined number of sweeps perpendicular to a boresight at a view point, incrementing the change in range $\Delta R$ from the view point and for each sweep, defining the changes $\Delta X$ and $\Delta Y$ in said grid data sweep, accumulating $\Delta X$ and $\Delta Y$ to generate an X,Y data base address for extracting the elevation for that sweep element, for each range increment $\Delta R$, stepping a view ray down by an increment of $\Delta R \operatorname{Tan} \phi_m$ where m refers to the $m^{th}$ view ray, and for each range increment $\Delta R$, increasing the distance between sweeps by the increment $\Delta R \Delta \operatorname{Tan} \phi$, comparing at each range increment $\Delta R$ the accumulated elevation value of the view ray with the elevation extracted with said X,Y data base address, and if a view ray strikes an elevation post, reading the data for that post to a display means. Otherwise reading the elevation data for the next elevation post from the data base, the improvement comprising the steps of dividing said grid data base into an array of data blocks;

sequentially transferring said data blocks to an on-line memory in an order to allow processing such that the sweep data remains continuous;

when a sweep leaves a data block, storing the exit processing parameters in a sweep table as sweep parameters; and when the sweep is again continued in a further data block, reading the sweep parameters in said sweep table as initial conditions for the processing of said future data block.

2. The improvement in the method of real-time computer generation of visual scenes according to claim 1 wherein the method of determining which view ray strikes an elevation post is performed by a view ray processor and said on-line memory is a ping-pong memory is composed of two random access memories and said step of sequentially transferring is performed by writing data into one of said random access memories from said data base while data is being read from the other of said random access memories to said view ray processor.

3. The improvement in the method of real-time computer generation of visual scenes according to claim 1 further comprising the steps of checking said X,Y data base address to determine if the address is a horizon point and if it is, then checking the sweep to determine if it is within the block being processed, otherwise checking to determine if said X,Y data base address is within the block being processed, if the X,Y data base address is a horizon point and the sweep is not within the block being processed, then calling the next data block to be processed, but if the X,Y data base address is not a horizon point or the sweep is within the block being processed, then checking the address to determine if it is within the block being processed, if the X,Y data base address is not within the block being processed, then commencing the next sweep, otherwise determining if the current view ray strikes an elevation post, and if the current view ray is occulted, when incrementing to the next point, otherwise writing the data for the current view ray as a pixel to said display means and then determining if the next view ray strikes an elevation post.

4. In a real-time computer image generating system comprising data base means for storing a grid data base of elevation posts at predetermined intervals for the visual scene to be generated and a view ray processor including sweep generation means for defining a horizontal field of view as a predetermined number of sweeps perpendicular to a boresight at a view point, range incrementing means for changing the range from the view point and for each sweep, defining the changes in $\Delta X$ and $\Delta Y$ in said grid data base, address means for accumulating $\Delta X$ and $\Delta Y$ to generate an X,Y data base address for extracting the elevation for that sweep element, said sweep generation means being responsive to said range incrementing means for stepping a view ray down by an increment of $\Delta R \tan \phi_m$ for each range increment $\Delta R$ where m refers to the $m^{th}$ view ray and increasing the distance between sweeps by the increment $\Delta R \Delta \tan \phi$, comparing means for comparing the accumulated elevation value of the view ray at each range increment $\phi R$ with the elevation extracted from said means for storing with said X,Y data base address, and means responsive to said comparing means for reading data for that post to a display means if the view ray strikes the post or reading the elevation data for the next elevation post from said storage means if the view ray does not strike the post, the improvement wherein said grid data base is divided into an array of data blocks within said storage meaas and said computer image generator means further comprises:

an on-line memory;

means for sequentially transferring said data blocks to said on-line memory in an order to allow processing such that the sweep data remains continuous;

block edge detection means responsive to said address generation means for detecting the edge of a data block currently being processed; and sweep memory means responsive to said block edge detection means for storing the exit processing parameters as sweep parameters, said sweep parameters being read out of said sweep memory means as initial conditions for the processing of the next data block said view ray processor.

5. The improvement in the real-time computer image generator system as recited in claim 4 wherein said on-line memory is composed of two random access memories arranged such that while data is being read from one to said view ray processor, data is being written into the other from said data base storage means.

6. The improvement in the real-time computer image generator as recited in claim 4 further comprisng a block detection selection means for storing the block selection order and the maximum and minimum sweep tangents that intersect each data block, said data base means being responsive to said block detection selection means for reading data into said on-line memory.

* * * * *